United States Patent [19]

Moore

[11] Patent Number: 4,783,922

[45] Date of Patent: Nov. 15, 1988

[54] MEMORY ENHANCING CALENDAR SYSTEM

[76] Inventor: Theodore W. Moore, 10403 N. 38th Street, Phoenix, Ariz. 85028

[21] Appl. No.: 77,455

[22] Filed: Jul. 24, 1987

[51] Int. Cl.⁴ .............................................. G09D 3/00
[52] U.S. Cl. ...................................... 40/107; 40/120; 434/433
[58] Field of Search ................. 40/107, 118, 119, 120; 434/236, 433

[56] References Cited

U.S. PATENT DOCUMENTS

| | | | |
|---|---|---|---|
| 1,316,039 | 9/1919 | James | 40/119 |
| 2,009,247 | 7/1935 | Barter | 40/119 |
| 4,028,826 | 6/1977 | Brandifino et al. | 40/118 X |
| 4,218,077 | 8/1980 | Ember | 40/107 |

FOREIGN PATENT DOCUMENTS 1460890 12/1966 France .................................. 40/119

Primary Examiner—A Michael Chambers
Assistant Examiner—John C. Fox
Attorney, Agent, or Firm—James F. Duffy

[57] ABSTRACT

A calendar system for training and enhancing the memory of a person practicing the methodology of the system. Two calendars are arranged side by side. The first calendar is permanent and reused each year. The user notes thereon events of perennial significance for reference at appropriate times throughout each year, thus regularly refreshing the users recollection of these events and enhancing the user's memory thereof. The second calendar is temporary in nature and meant to be replaced at regular intervals. Unlike the first calendar, the second is provided with indicia representative of the instant calendar year, as well as indicia representing the day-names of the week. The user records on this second calendar current and near-future events of transient significance. This second calendar is disposed of and a replacement provided therefor at selected regular intervals since the record of transient event data is not intended for perennial reference. A mounting base, available in multiple forms, maintains the two calendars in close juxtaposition.

11 Claims, 1 Drawing Sheet

MEMORY ENHANCING CALENDAR SYSTEM

BACKGROUND

1. FIELD OF THE INVENTION

The invention relates to a memory training and enhancing method and device for bringing to the user's memory the recollection of events of perennial significance while providing means and method for reminding the user of current and near-future events of transient significance.

In particular the invention is a calendar system in which events of signficance are recorded by the user. The record of events of perennial significance is preserved; while the record of events of transient significance is removed at selected, regular intervals and new means for recording such events substituted therefor.

2. PRIOR ART

A search of the prior art has revealed many disclosures of calendar systems. None of those uncovered, however, would affect the decision as to the patentability of the instant invention. One of the disclosures is interesting in that it relates to a perpetual calendar having indicia recorded thereon representative of seasonally related events of a perennial nature. The pre-printed indicia refer to seasonal events rather than events with specific day-date significance. The occurrence of the events represented by the pre-printed indicia depend upon the vagaries of the weather at the situs of the calendar. It uses a single calendar which is, indeed, perpetual in nature in that provision is made to adjust the correlation between day-date and day-name with each passing year. It makes no provision for the user's permanent recording of personal events of perennial significance; nor for the replaceable segregation therefrom of the user's recordings of personal events of transient significance.

The disclosure referred to is U.S. Pat. No. 3,316,668, issued to C. H. ROGERS, on May 2 1967.

SUMARY OF THE INVENTION

The invention may be described as a memory training and enhancing system for bringing to mind the user's memory of events of perennial significance and preserving a record of these events in a permanent format, while also preserving for transient reference passing events in a non-permanent format. The system comprises a permanent, annually reusable calendar for recording of events of permanent significance; a replaceable calendar for recording events of current and near-future transient significance; and means for maintaining the permanent, annually reusable calendar adjacent the replaceable calendar such that the recording of events of both transient and perennial significance occurring on the same calendar date are in close juxtaposition.

The invention may be otherwise summarized as a memory training and enhancing system for bringing to mind the user's memory of events of perennial significance and perserving a record of these events in a permanent format, while also preserving for transient reference passing events in a non-permanent format. The system comprises a permanent entry calendar bearing indicia representative of the calendar month and day-date, and a date entry region associated with each said day-date indicia for the recording of data to be permanently preserved from year to year; a replaceable, transient-entry calendar bearing indicia representative of the calendar month and day-date and a date entry region associated with each day-date indicia for the recording of data of a transient nature not subject to preservation from year to year; and means for removably supporting each of the permanent entry calendar and the transient-entry calendar in close juxtaposition such that the day-date indicia and their associated data entry regions are generally aligned one to the other.

As set forth herein the means for removably supporting the calendars aligned and in close juxtaposition is disclosed as alternatively comprising a wall to which the calendars are coupled; a base suitable for placement on a desk or other generally horizontal surface; a slide frame to which each of the calendars is slide-coupled; a name plate bearing indicia representative of a name, visable when viewed from a first perspective, and supporting the calendars, visable when viewed from a second perspective; and, an inner face of a portfolio to which the calendars are coupled.

The replaceable, transient-entry calendar may bear indicia thereon comprising all indicia standard to a calendar and representative of the calendar year, month, day-name, and day-date.

The permanent-entry calendar may bear only selected indicia found on standard calendars: month, and day-date; no year or day-name indicia being indicated.

The invention may also be described as a memory training and enhancing method for permanently preserving the record of events of perennial significance and for temporarily preserving a record of events of a transient nature comprising the steps of:

a. providing a first and a second calendar, each bearing indicia representative of a day-date, and each having a data entry region associated with each day-date indicia;

b. configuring each calendar so that when they are placed in close juxtaposition the day-date indicia and associated data entry regions of each calendar will be aligned;

c. recording on the first calendar, memoranda of events of perennial significance in the date entry regions associated which the day-date indicia representative of the day-date on which the events first occurred;

d. maintaining the first and the second calendars in close juxtaposition such that the day-date indicia and associated data entry regions of each calendar are aligned;

e. recording, on the second calendar, memoranda of current and near-future events of transient significance in the date entry regions associated with the day-date indicia representative of the day-date of the occurrence of the current and near-future events;

f. updating the memoranda on the first calendar as current events of perennial significance occur;

g. preserving the first calendar as an annual reference to train and enhance one's memory of events of perennial significance; and h. replacing the second calendar, at selected regular intervals, with a new "second" calendar so that memoranda of new events of current and near-future transient significance may be recorded thereon.

The method further comprises the step of repeating steps (d) through (h) at selected regular intervals, and, alternatively, including the step of providing the second calendar with indicia representative of the current year.

The invention is further disclosed at the products produced by the practice of the processes set forth in the methodology disclosed and claimed herein.

DETAILS OF THE INVENTION

Figure 1:
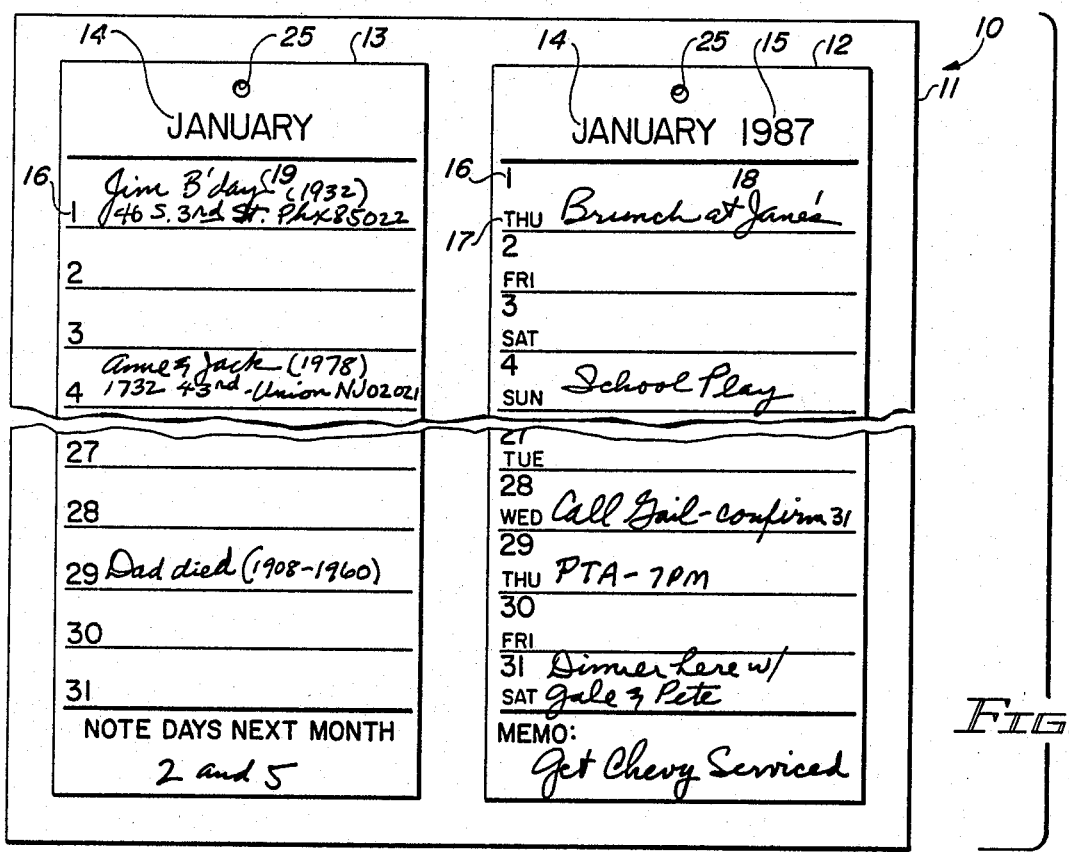
FIG. 1 illustrates the calendar for permanent recording of events of perennial significance mounted adjacent the replaceable calendar for recording current and near-future events of transient significance.

For the purposes of promoting an understanding of the principles of the invention, the reference will now be made to the embodiments illustrated in the drawings and specific language will be used to describe the same. It will, nevertheless, be understood that no limitation of the scope of the invention is thereby intended; such alterations and further modifications in the illustrated device, and such further applications of the principles of the invention as illustrated herein, being contemplated as would normally occur to one skilled in the art to which the invention relates.

In FIG. 1, the invention 10 is illustrated and is seen to comprise a base 11 to which is coupled a transient-event calendar 12 and a perennial-event calendar 13. Base 11 may be a decorative mounting base for use on a desk top or other working surface. Alternatively, base 11 may comprise a vertical surface, such as the wall of a room. In this latter instance, calendars 12 and 13 may be coupled to the vertical surface by use of a fastener, e.g. a thumbtack, inserted into the surface through mounting holes 25 in calendars 12 and 13.

Both calendars 12 and 13 have imprinted thereon indicia 14, representative of the name of a month, and 16, representative of the day-dates of that month. Transient event calendar 12 is also provided with indicia 15, representative of the calendar year, and 17, representative of the day-names of the days of the week. Perennial-event calendar 13, meant to be retained, updated, and used year after year, does not require the provision of indicia 15 and 17.

Transient-event calendar 12 is provided with a data entry region 18 associated with each day-date indicium 16 wherein the user may record current and near-future events of transient significance. Entry of notations of events of passing significance are illustrated on the drawing of calendar 12 in FIG. 1. Because these events lose their significance with the passage of time, calendar 12 is replaced at regular intervals, and a new calendar 12 is is provided for the recordation of passing events of more current significance.

Perennial event calendar 13 is provided with a date entry region 19 associated with each day-date indicium 16 wherein the user may record events of perennial significance to the user. Entry of events of perennial significance are illustrated on the drawing of calendar 13 in FIG. 1. Because these events retain their significance year after year, calendar 13 is retained and used with each passing year. Notations of newly occurring events of perennial significance are recorded in data entry regions 19 as these events occur. An example of events of perennial significance would be Birth Dates, Dates of Wedding Anniversaries, and Dates of Death.

In the preferrede methodology for practicing the invention, as well as the preferred embodiment of the invention, calendars 12 and 13 are maintained in close juxtaposition such that the day-date indicia 16 and their associated data entry regions are aligned and the user may readily review the events of both transient and perennial significance associated with a given day-date. In this manner, the user's recollection is constantly refreshed to remind the user to take such action as may be appropriate with respect to a given event. Because calendar 13 is maintained up dated and re-used on an annual basis, the user's memory is refreshed on an annual basis and, through repeated use of the invention over the years, the user's memory of events of perennial significance is enhanced.

It should be noted that use of the invention obviates the necessity to enter anew, in each annually obtained calendar, notations of events of perennial significance. Most persons deem it an onerous chore to each year make the necessary entries on the calendar of the New Year. Often the task is postponed. Frequently it is omitted all together, in which case, all memory of these perennially significant events is frequently lost with the result that friends and relatives are distanced for lack of contact on occassions of importance to them.

Figures 2, 3, 5:
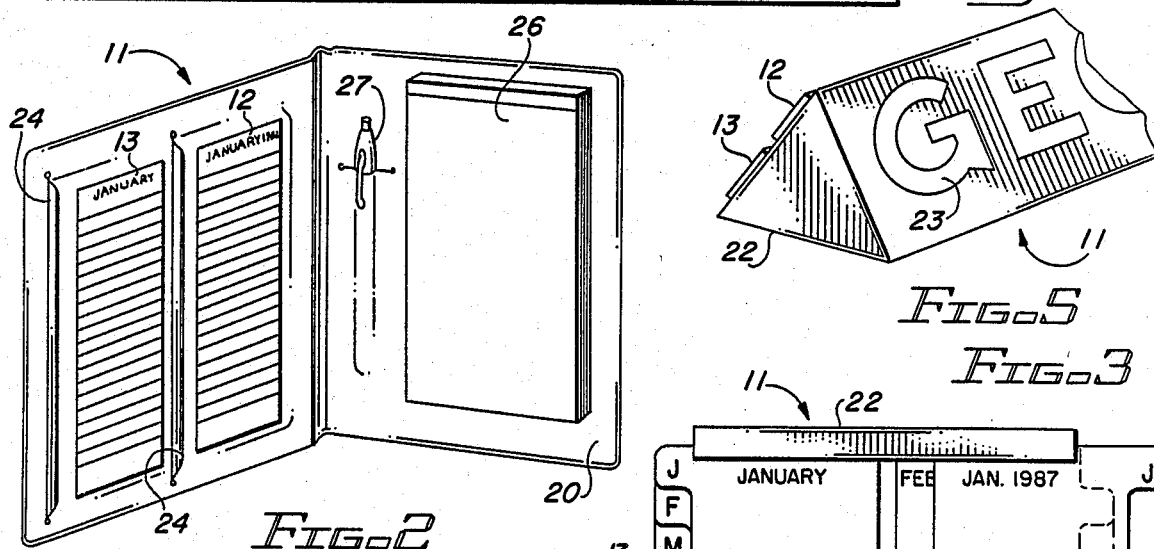
FIG. 2 shows and alternate embodiment in which the mounting base of the calendar system is a portfolio.
In FIG. 3, the calendar system is slide-coupled to a mounting base.
FIGS. 4 & 5 illustrate the manner in which a desk name plate may serve as a mounting base for the calendar system.

In FIG. 2, mounting base 11 takes the form of a portfolio 20. Calendars 12 and 13 are coupled to portfolio 20 by insertion into slotted pockets 24. To reduce bulk, calendars 12 and 13 may each comprise six sheets on which indicia are imprinted on each side thereof. A single pocket which slot 24 horizontal (i.e. rotated 90 degrees from that illustrated in FIG. 2) would also provide means for coupling calendars 12 and 13 to mounting base 11.

Portfolio 20 may also be provided with a note pad 26. Note pad 26 may be of letter-quality stationery so as to be conveniently at hand for correspondence prompted by the recall of an event of perennial significance after referral to the data entries on calendar 13.

Figure 4:
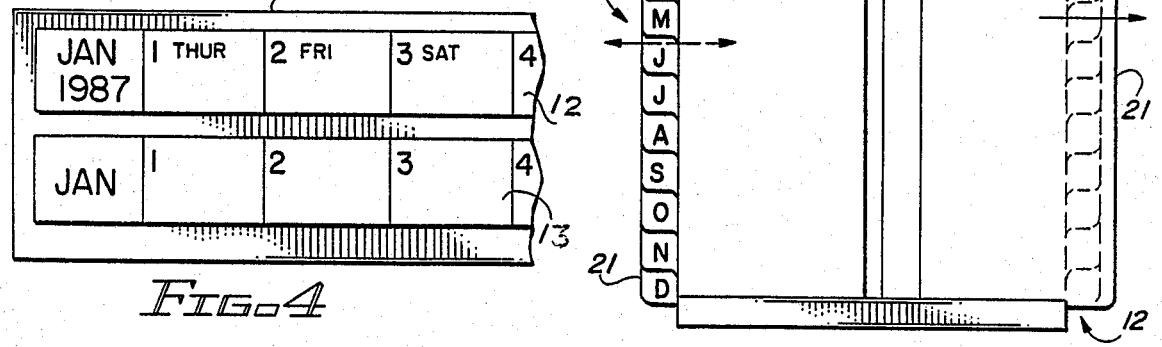

The remaining FIGS. 3-5, are provided to suggest the multiplicity of forms that mounting base 11 might assume. In FIG. 3, base 11 is a slide-mount base 22 to which the indexed pages 21 of calendars 12 and 13 are slide coupled. As with the calendars coupled to portfolio 20, calendar sheets 21 may be imprinted on both sides to reduce bulk.

In FIGS. 4 & 5, base 11 takes the form of a desk-top name plate 22. Calendars 12 and 13 are coupled to a selected face of name plate 22 so as to be visable from the perspective of the user of the invention. A second selected face of name plate 22 bears indicia 23 representative of a name to be viewed from the perspective of one approaching the desk of the user of the invention.

What has been described is a calendar system for training and enhancing the memory of a person practicing the methodology of the system. Two calendars are arranged side by side. The first calendar is permanent and reused each year. The user notes thereof events of perennial significance for reference at appropriate times throughout each year, thus regularly refreshing the users recollection of these events and enhancing the user's memory thereof. The second calendar is temporary in nature and meant to be replaced at regular intervals. Unlike the first calendar, the second is provided with indicia representative of the instant calendar year, as well as indicia representating the day-names of the week. The user records on this second calendar current and near-future events of transient significance. This second calendar is disposed of and a replacement provided therefor at selected regular intervals since the record of transient event data is not intended for perennial reference. A mouting base, available in multiple forms, maintains the two calendars in close juxtaposition.

Those skilled in the art will recognize that other embodiments of the invention may be drawn from the illustrations and the teachings herein. To the extent that such alternate embodiments are so drawn, it is intended that they shall fall within the ambit of protection of the Claims appended hereto.

Having disclosed my invention is the foregoing specification and accompanying drawings in such clear and concise manner that those skilled in the art will readily understand and easily practice the invention, that which I claim is:

1. A memory training and enhancing system for bringing to mind the user's memory of events of perennial significance and preserving a record of these events in a permanent format, while also preserving for transient reference passing events in a non-permanent format, said system comprising:
   a permanent, annually reusable calendar for recording of events of permanent significance;
   a replaceable calendar for recording events of current and near-future transient significance; and
   means for maintaining said permanent, annually reusable calendar adjacent said replaceable calendar such that the recording of events of both transient and perennial significance occurring on the same calendar date are in close juxtaposition.

2. A memory training and enhancing system for bringing to mind the user's memory of events of perennial significance and preserving a record of these events in a permanent format, while also preserving for transient reference passing events in a non-permanent format, said system comprising:
   a permanent entry calendar bearing indicia representative of the calendar month and day-date, and a data entry region associated with each said day-date indicia for the recording of date to be permanently preserved from year to year;
   a replacable, transient-entry calendar bearing indicia representative of the calendar month and day-date and a data entry region associated with each day-date indicia for the recording of data of a transient nature not subject to preservation from year to year; and
   means for removably supporting each of said permanent entry calendar and said transient-entry calendar in close juxtaposition such that the day-date indicia and their associated date entry regions are generaly aligned one to the other.

3. The system of claim 2 wherein said means for removably supporting said calendars aligned and in close juxtaposition comprises a wall to which said calendars are coupled.

4. The system of claim 2 wherein said means for removably supporting said calendars aligned and in close juxtaposition comprises a base suitable for placement on a desk or other generally horizontal surface.

5. The system of claim 2 wherein said means for removably supporting said calendars aligned and in close juxtaposition comprises a slide frame to which each of said calendars in slide- coupled.

6. The system of claim 2 wherein said means for removably supporting said calendars aligned and in close juxtaposition comprises a name plate bearing indicia representative of a name, visible when viewed from a first perspective, and supporting said calendars, visable when viewed from a second perspective.

7. The system of claim 2 wherein said means for removably supporting said calendars aligned and in close juxtaposition comprises an inner face of a portfolio to which said calendars are coupled.

8. The system of claim 2 wherein said replaceable, transient-entry calendar bears indicia thereof comprising all indicia standard to a calendar and representative of the calendar year, month, day-name, and day-date.

9. The system of claim 2 wherein said permanent-entry calendar bears only selected indicia found on standard calendars: month, and day-date; no year or day-name indicia being indicated.

10. A memory training and enhancing method for permanently preserving the record of events of perennial significance and for temporarily preserving a record of events of a transient nature comprising the steps of:
   a. providing a first and a second calendar, each bearing indicia representative of a day-date, and each having a data entry region associated with each day-date indicia;
   b. configuring each said calendar so that when they are placed in close juxtaposition the day-date indicia and associated data entry regions of each calendar will be aligned;
   c. recording on said first calendar memoranda of events of perennial significance in the data entry regions associated with the day-date indicia representative of the day-date on which the events first occurred;
   d. maintaining said first and said second calendars in close juxtaposition such that the day-date indicia and associated data entry regions of each calendar are aligned;
   e. recording, on said second calendar, memoranda of current and near-future events of transient significance in the data entry regions associated with the day-date indicia representative of the day-date of the occurrance of said current and near-future events;
   f. updating the memoranda on said first calendar as current events of perennial significance occur;
   g. preserving said first calendar as an annual reference to train and enhance one's memory of events of perennial significance; and
   h. replacing said second calendar, at selected regular intervals, with a new said second calendar so that memoranda of new events of current and near-future transient significance may be recorded thereon.

11. The method of claim 10 further comprising the step of providing said second calendar with indicia representative of the current year.

* * * * *

UNITED STATES PATENT AND TRADEMARK OFFICE
CERTIFICATE OF CORRECTION

PATENT NO. : 4,783,922

DATED : November 15, 1988

INVENTOR(S) : Theodore W. Moore

It is certified that error appears in the above-identified patent and that said Letters Patent is hereby corrected as shown below:

Column 1, line 65, "a date entry" should read -- a data entry --.

Column 2, line 1, "a date entry" should read -- a data entry --.

Column 2, line 52, "the date entry" should read -- the data entry --.

Column 3, line 61, "with a date" should read -- with a data --.

Column 4, line 29, "occassions" should read -- occasions --.

Column 4, line 62, "thereof" should read -- thereon --.

Column 5, line 47, Claim 2, line 10, "recording of date" should read -- recording of data --.

Column 5, line 58, Claim 2, line 21, "associated date" should read -- associated data --.

Signed and Sealed this

Fourteenth Day of March, 1989

Attest:

DONALD J. QUIGG

*Attesting Officer*     *Commissioner of Patents and Trademarks*